(12) United States Patent
Rigling et al.

(10) Patent No.: US 11,923,137 B2
(45) Date of Patent: Mar. 5, 2024

(54) ELECTROMAGNETIC ACTUATOR ARRANGEMENT

(71) Applicant: ETO MAGNETIC GMBH, Stockach (DE)

(72) Inventors: Timo Rigling, Moos (DE); Markus Oczkowski, Überlingen (DE)

(73) Assignee: ETO MAGNETIC GMBH, Stockach (DE)

( * ) Notice: Subject to any disclaimer, the term of this patent is extended or adjusted under 35 U.S.C. 154(b) by 265 days.

(21) Appl. No.: 17/438,491

(22) PCT Filed: Feb. 12, 2020

(86) PCT No.: PCT/EP2020/053633
§ 371 (c)(1),
(2) Date: Sep. 13, 2021

(87) PCT Pub. No.: WO2020/182400
PCT Pub. Date: Sep. 17, 2020

(65) Prior Publication Data
US 2022/0148781 A1 May 12, 2022

(30) Foreign Application Priority Data

Mar. 13, 2019 (DE) ................... 10 2019 106 365.5

(51) Int. Cl.
*H01F 7/121* (2006.01)
*G01D 5/14* (2006.01)
*H01F 7/08* (2006.01)

(52) U.S. Cl.
CPC ............ *H01F 7/121* (2013.01); *G01D 5/145* (2013.01); *H01F 7/081* (2013.01); *H01F 2007/086* (2013.01)

(58) Field of Classification Search
CPC .... H01F 7/121; H01F 7/081; H01F 2007/086; H01F 7/1607; G01D 5/145;
(Continued)

(56) References Cited

U.S. PATENT DOCUMENTS 9,318,247 B2 * 4/2016 Schiepp ................ H01F 7/1646
2013/0320941 A1 * 12/2013 Contaldo ................ G01D 5/145
323/273

FOREIGN PATENT DOCUMENTS

CN 106169350 A * 11/2016 .......... H01F 7/1646
DE 102006016650 A1 10/2007
(Continued)

OTHER PUBLICATIONS

International search report for patent application No. PCT/EP2020/053633 dated Apr. 16, 2020.

*Primary Examiner* — Mohamad A Musleh
(74) *Attorney, Agent, or Firm* — Bachman & LaPointe, P.C.

(57) ABSTRACT

The invention relates to an electromagnetic actuator arrangement comprising an electromagnetic actuator device (2), in particular a camshaft adjusting device, having a housing (4) and at least one armature unit which can be driven, in response to the energization of a stationary, axially aligned coil unit, in or parallel to the axial direction and which is designed to interact with at least one slide and/or tappet unit (6, 7) extending in the axial direction, in particular a tappet unit (6, 7) effecting a camshaft adjustment of an internal combustion engine, and at least one switching gate (12) which can be arranged on a slide cam (14) and through which a transverse central plane (56) passes, wherein the actuator device (2) comprises a detection device for contactless magnetic and/or electrical interaction with the switching gate (12), which detection device comprises at least one magnetic field and/or electric field detection means
(Continued)

which is designed to produce and/or detect a detection field acting directly on the switching gate (12), and a detection field evaluation means (32) which is designed to determine the position of the switching gate (12) by means of the measured detection field, the magnetic field and/or electric field detection means being arranged at least partially outside the housing (4).

19 Claims, 4 Drawing Sheets

(58) Field of Classification Search
CPC ......... F01L 2013/0052; F01L 2013/101; F01L 2800/14; F01L 2820/04; F01L 13/0036
See application file for complete search history.

(56) References Cited

FOREIGN PATENT DOCUMENTS

| | | | |
|---|---|---|---|
| DE | 102008049103 A1 | 4/2010 | |
| DE | 202010010371 U1 | 10/2011 | |
| DE | 102010035186 A1 | 3/2012 | |
| DE | 102012014048 A1 * | 1/2014 | .............. F01L 1/047 |
| DE | 102013204655 A1 * | 9/2014 | .............. F01L 1/047 |
| DE | 102018106905 A1 | 10/2018 | |

* cited by examiner

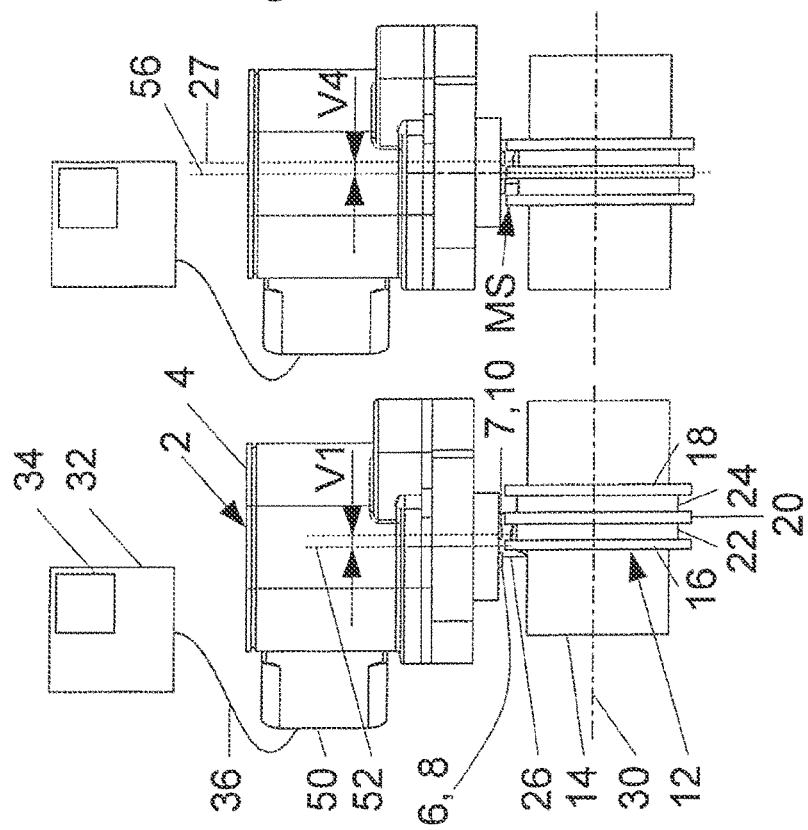

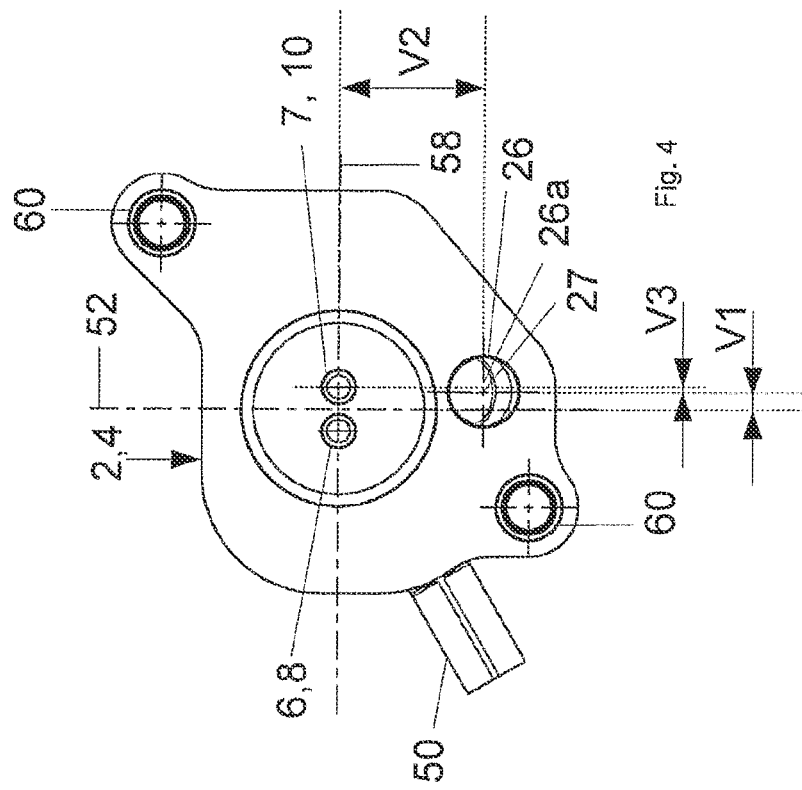
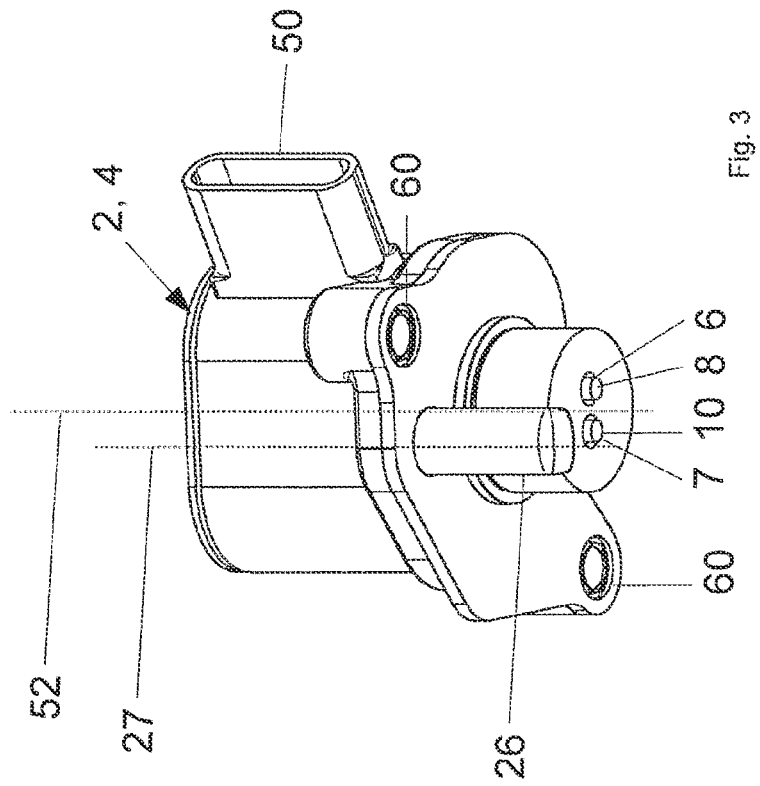

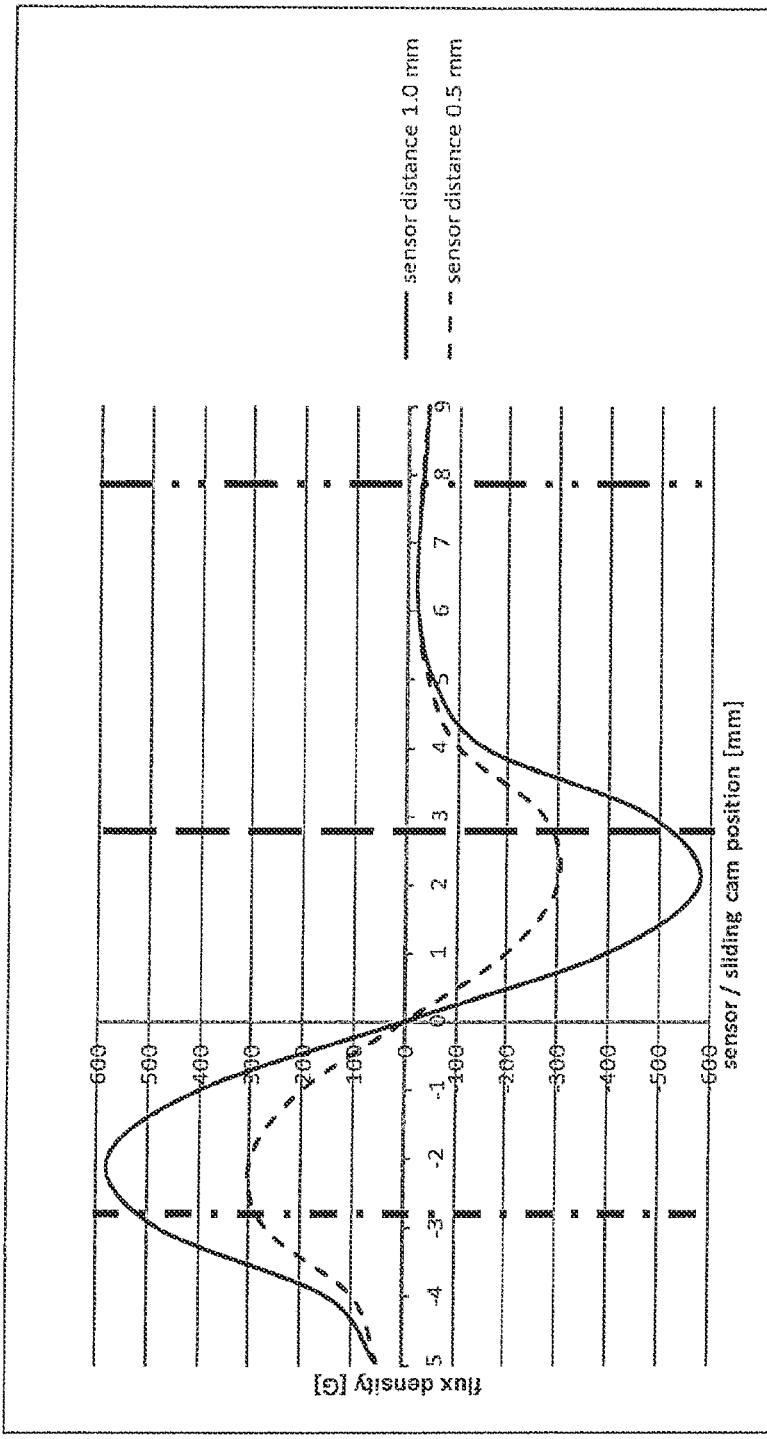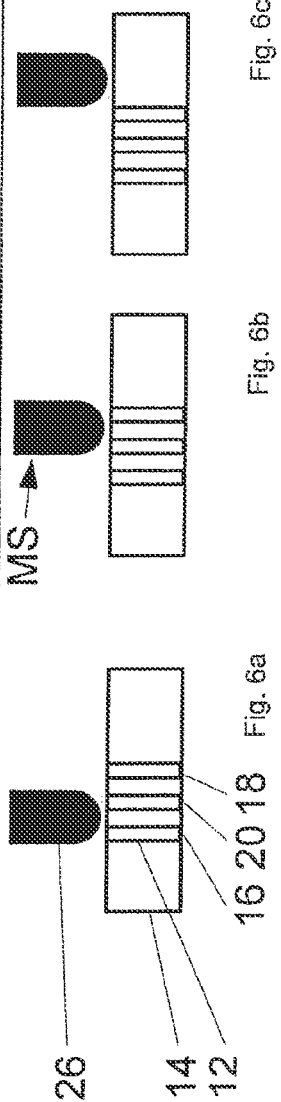

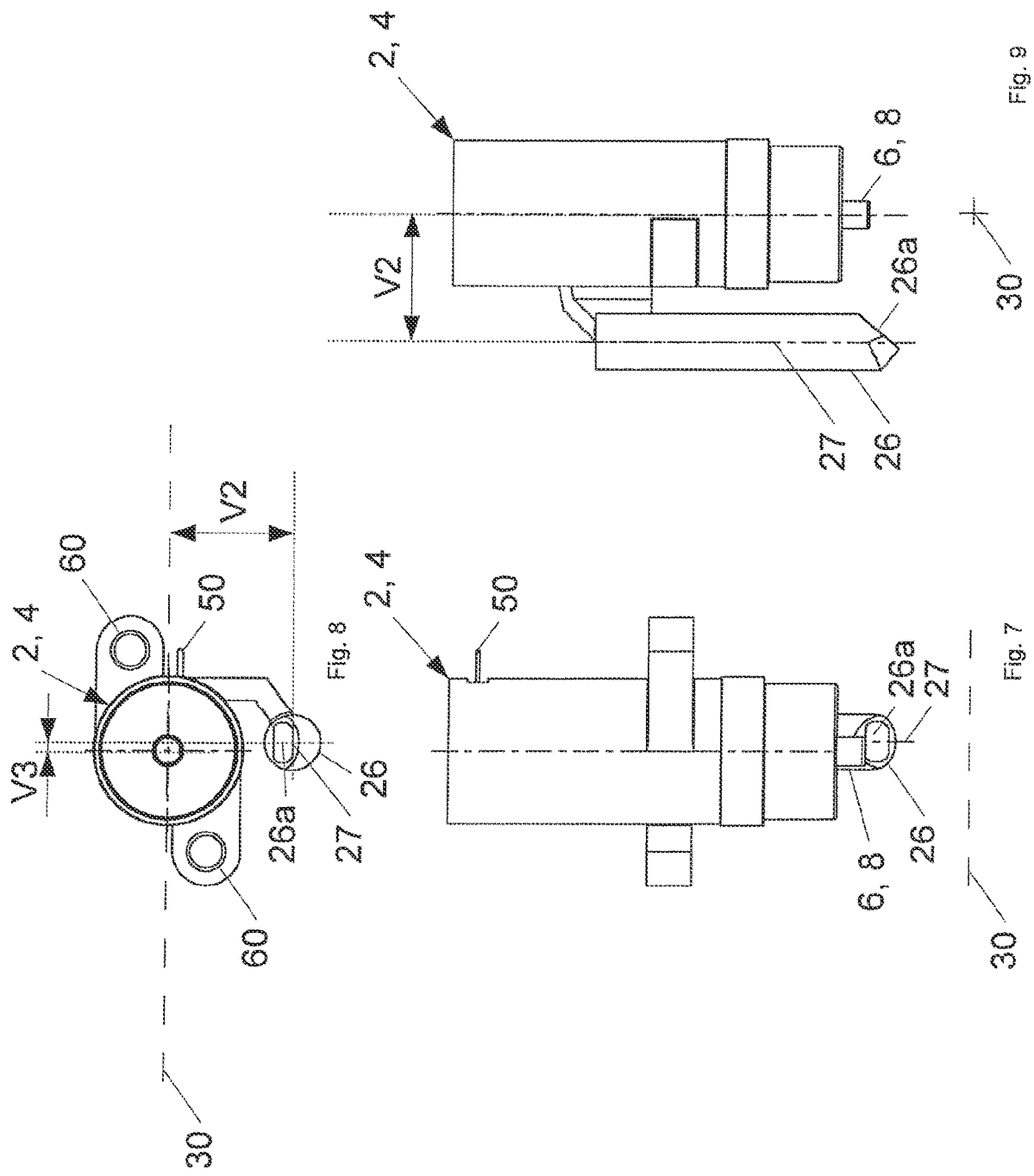

ELECTROMAGNETIC ACTUATOR ARRANGEMENT

BACKGROUND OF THE INVENTION

The present invention relates to an electromagnetic actuator arrangement, to an electromagnetic actuator device and to a use of same.

Such an actuator arrangement comprising an electromagnetic actuator device which is particularly suitable as a camshaft adjustment device and which has an armature unit which can be driven along the or parallel to the axial direction in response to an energization of a stationary, axially oriented coil unit is known from practice. The armature unit is configured to interact with a slide and/or plunger unit which extends in the axial direction, wherein, in particular, a camshaft adjustment of a combustion engine can thus be caused. To this end, the slide and/or plunger unit engages into a shift gate which can in particular be disposed on a sliding cam. In such a design, the shift gate is disposed at the circumference of the sliding cam. A transverse center plane can pass through the shift gate.

To determine the axial position of the sliding cam in relation to the camshaft, known actuator arrangements or sliding cam actuators can have Hall sensors for the detection of the armature position. Said Hall sensors are completely disposed inside the actuator housing and can determine the axial position of the shift gate only indirectly via the position of the armature. Such Hall sensors for the lift position detection of the armature of the sliding cam actuator are generally realized by over-molding in a plastic housing.

The disadvantage of such a lift detection on the armature is that the axial position of the shift gate is not directly determinable. Another disadvantage of the lift detection on the armature is that the integrated sensor can only detect whether an armature is retracted or extended. However, in a sliding cam actuator which has several actuators, it is not possible to distinguish which of the armatures is extended. This would require an additional second Hall sensor.

Another way of determining the position of the shift gate is the arrangement of a separate sensor completely outside the actuator housing. However, a disadvantage of this design is the exposed position of the sensor on a cylinder head. Moreover, such a sensor requires additional fastening elements for its installation on the cylinder head and considerable installation space. Especially the design of the fastening elements and of an accommodation geometry—usually on a cylinder head cover in the context of a combustion engine—involves considerable additional expense. Furthermore, this design results in the disadvantage that an additional plug together with a wiring harness are required in order to connect the sensor.

Sensors which can detect the direction of the magnetic field by means of vertical and also by means of oblique magnetic field lines in relation to the sensitive surface are also known from practice. Such detection means, also known as 3D sensors, determine the exact position in three space directions by means of the magnetic field direction and are cost-intensive.

SUMMARY OF THE INVENTION

Thus, the object of the invention is to propose an electromagnetic actuator arrangement, an electromagnetic actuator device and the use of the actuator arrangement which overcomes the problems of the state of the art, in particular in that an actuator arrangement is created which allows a cost-effective production, a flexible design and a high-quality and clear position detection of the shift gate while requiring low installation space.

Said object is attained by the electromagnetic actuator arrangement as disclosed herein, by the electromagnetic actuator device as disclosed herein and by the use of the actuator arrangement also as disclosed herein.

Advantageous embodiments of the invention are disclosed herein and in the dependent claims, all combinations of at least two features disclosed in the description, the claims and/or the figures constituting part of the scope of the invention.

According to the invention, an electromagnetic actuator arrangement is proposed, comprising an electromagnetic actuator device, in particular a camshaft adjustment device, having a housing and at least one armature unit which is drivable along the or parallel to the axial direction in response to an energization of a stationary, axially oriented coil unit and which is configured to interact with at least one slide and/or plunger unit which extends in the axial direction, in particular a plunger unit which causes a camshaft adjustment of a combustion engine. The actuator arrangement also comprises a shift gate which can be disposed on a sliding cam and through which a transverse center plane passes. The actuator device comprises a detection device which is designed for the contactless magnetic and/or electrical interaction with the shift gate and which comprises at least one magnetic field and/or electric field detection means which is designed to create and/or detect a detection field acting directly on the shift gate, and which comprises a detection field evaluation means which is designed to determine the position of the shift gate by means of the measured detection field. The magnetic field and/or electric field detection means is at least partially disposed outside the housing of the actuator arrangement.

According to the invention, it is now possible to integrate a sensor for detecting at least the axial position of the shift gate directly into the actuator device or to fasten said sensor to the actuator device and thus to eliminate the need for an additional position sensor, which can be disposed on a cylinder head, for example, whereby a direct identification of the position of the shift gate is possible and considerable installation space can be saved.

The advantageous effect also results in particular from the fact that the shaping of the actuator device and the positioning of the magnetic field and/or electric field detection means can be very flexible and a single shared plug connection can be realized for the actuator device and the magnetic field and/or electric field detection means.

Furthermore, the lift sensor previously used to determine the armature position and thus to indirectly determine the shift gate position is no longer required, which provides flexibility with respect to the design, creates low design complexity and also reduces costs.

Another advantage is that no additional separate sensor which has the disadvantages mentioned above, such as a large installation space, additional components, an additional wiring harness, its own plug, increased costs or corresponding fastening elements, is required.

The axial position of the shift gate can be detected by means of the magnetic field and/or electric field detection means, preferably in that a measured analog signal is first converted into a digital signal and in that, for at least defined axial positions of the shift gate, characteristic position-related magnetic fields and/or electric fields (voltage potential) and/or sensor signal values are known and/or can be stored in a memory of the evaluation means and/or that the axial position of the shift gate can be determined by the evaluation means by a comparison and/or an offsetting of the currently identified detection field with/against the stored data or a detection field map (for example a magnetic field map).

The detection field can be a magnetic, an electromagnetic and/or an electric field, for example. The detection field is at least located in the space between the detection means and the shift gate.

The evaluation means is basically a technical intelligence which is configured to process and/or evaluate the signal of the magnetic field and/or electric field detection means. For example, it can be an engine control unit to which the actuator device can be connected in order to exchange data. However, the evaluation means can also be integrated directly into the housing as a processing unit autonomous or separate from the motor control unit in order to realize an embedded system.

Among other things, a compact and cost-effective solution is thus created by means of the teaching according to the invention in order to directly determine the position of the shift gate.

The transverse center plane passing through the shift gate is disposed in such a manner that the adjustment axis axially passing through the shift gate is aligned with a normal vector of the transverse center plane. In the axial direction of the shift gate, the transverse center plane is disposed in the geometric center.

According to a preferred embodiment of the actuator arrangement according to the invention, the magnetic field detection means comprises a magnetic field sensor, in particular a Hall sensor, preferably a linear Hall sensor. Such a sensor is cost-effective and contributes to the effects according to the invention in an advantageous manner, in particular in that the sensor can detect the deformation of the detection field caused by the shift gate. A linear Hall sensor is particularly suitable for the position detection, because its output does not take a discrete shift state depending on the detection field, but outputs a signal which is proportional to the field strength. Said output signal can be provided as a pulse-width modulated signal (PWM signal), preferably to a control unit or to the detection field evaluation means.

It is also conceivable that the magnetic field detection means additionally or alternatively comprises a permanent magnet means for creating the detection field. Said generated magnetic or electromagnetic field is particularly suitable for the actuator arrangement according to the invention. Since the magnetic field detection means has a considerable spatial distance from the coil unit compared to arrangements known from the state of the art, its own magnetic field generated by means of the permanent magnet is appropriate for determining the position of the shift gate.

Alternatively or additionally, it is conceivable that the electric field detection means is a capacitive sensor. Advantageously, a position of the shift gate can thus be detected, even if non-conductive materials, such as plastic, are used therefor. In this case, the shift gate is used as a switch lug which changes the detection field in the case of a capacitive sensor. Said change can be measured by means of a capacitive sensor and can be assigned to an axial shift gate position.

Another preferred embodiment of the actuator arrangement according to the invention provides that, at least in a center position of the plunger unit or of the plunger units in relation to the shift gate, a longitudinal center axis passing through the at least one magnetic field and/or electric field detection means is disposed at a distance from the transverse center plane of the shift gate in the longitudinal direction of an adjustment axis of the sliding cam. A center position is reached when the plunger unit or the plunger units is/are disposed centrally in relation to the shift gate; here, preferably the geometric center is meant in each case. Thus, the at least one magnetic field and/or electric field detection means is disposed off-center in relation to the center position in order to generate a clear signal. If the magnetic field and/or electric field detection means was disposed centrally in relation to the shift gate center, the detection of the shift gate position would potentially be subject to high tolerances and would thus not be robust and reliable. Additionally, it would not be possible to clearly assign the signal to a shift gate position in the central arrangement.

According to another preferred embodiment of the actuator arrangement according to the invention, it is conceivable that in at least one, preferably each, engagement position between the at least one plunger unit and the shift gate, a longitudinal center axis passing through the at least one magnetic field and/or electric field detection means is disposed outside a mirror symmetry plane of the shift gate. The mirror symmetry plane passing through the shift gate is disposed in such a manner that the adjustment axis axially passing though the shift gate is aligned with a normal vector of the transverse center plane. The mirror symmetry plane can—but does not have to—coincide with the transverse center plane. In this case, mirror symmetry can refer to a complete symmetry but also to a partial mirror symmetry. The crucial point is that, at least in the engagement position, different shift gate geometries are provided on either side of the magnetic field and/or electric field detection means in the direction of the adjustment axis. This embodiment is based on the idea that a magnetic field and/or electric field detection means which is oriented or disposed centrally relative to a shift gate at least partially mirror-symmetrical in relation to its mirror symmetry plane may supply no signal or no clear signal. Thus, the magnetic field and/or electric field detection means can now output different signals which clearly indicate at least the axial position of the shift gate in a simple and clear manner. This embodiment allows the clear detection of up to three shift positions using a single detection means, for example. An engagement position or a shift position is provided if at least one plunger unit can functionally engage into the shift gate.

Advantageously, the magnetic field detection means can be configured to detect the negative and/or positive magnetic field or the flux density and/or the field strength. It is also conceivable that the detection means detect only those magnetic field lines which are oriented perpendicular to its sensitive surface. The proportion of the magnetic field lines detected by the detection means changes as a result of the displacement of the shift gate. The detection means can also detect the direction of the magnetic flux (positive/negative) of the vertical magnetic field lines.

However, such a detection means in combination with a distance described above or an arrangement outside a mirror symmetry plane of the shift gate makes a known detection means unnecessary, the known detection means detecting the direction of the magnetic field not only by means of vertical, but also by means of oblique magnetic field lines in relation to the sensitive surface and also being known as a 3D sensor. Thus, another advantage of the invention is that the position of the shift gate can be detected by means of a detection means which is significantly less expensive.

According to another preferred embodiment, it is conceivable that, in at least one, preferably each, engagement position between the at least one plunger unit and the shift gate of the electromagnetic actuator arrangement, a longitudinal center axis of the at least one magnetic field and/or electric field detection means passing through the at least one magnetic field and/or electric field detection means is disposed and/or can be disposed in such a manner that the shift gate has different outer geometry shapes, preferably different detectable geometries, on either side of the magnetic field and/or electric field detection means in the longitudinal direction of an adjustment axis of the sliding cam. This embodiment realizes the advantages described in the preceding paragraph in an analogous manner; in this case, the symmetry of the shift gate is not required.

In another preferred embodiment of the actuator arrangement according to the invention, the magnetic field and/or electric field detection means is at least partially disposed in the area between the housing and the shift gate. In this way, the detection means can be placed further away from the coil unit and closer to the shift gate. Such an arrangement results in particular in a housing which is not highly complex and requires little installation space.

Furthermore, the option to integrate the magnetic field and/or electric field detection means at least partially into the housing of the electromagnetic actuator device has proven to be advantageous, wherein the housing can be produced according to an injection molding process. In a more preferred alternative, the injection molding process can be a plastic injection molding process. In such an embodiment, the detection means can be integrated into the housing in a particularly advantageous manner. Thus, a single, preferably one-piece housing is realizable.

It is also conceivable that the actuator arrangement comprises a magnetic field shield means for shielding the detection field from the magnetic field of the at least one coil unit. Said shield means can be the housing or a housing section, for example, in order to avoid an impact on the detection field, which can lead to a clear detection.

The electromagnetic actuator device can have a plurality of electromagnetic actuator units which can be selectively controlled in order to independently apply an actuation force to a corresponding plurality of plunger units which are mounted axially parallel to one another. Alternatively, the electromagnetic actuator device can have a single actuator unit which can be selectively controlled in order to apply an actuation force to a plunger unit. An actuator unit can comprise a coil unit and an armature unit and a slide and/or plunger unit—for example, an embodiment having two actuator units is conceivable. The actuator units can be provided in a shared, preferably cylindrical and/or hollow cylindrical housing. Additionally, an actuator device having several slide and/or plunger units and requiring low installation space can be created in this way.

It is also conceivable that the direct distance between the sensitive surface of the at least one magnetic field and/or electric field detection means and the shift gate is between 0 mm and 2.0 mm, preferably between 0.5 mm and 1.0 mm. The direct distance can also be referred to as a radial distance in relation to the shift gate. However, the distance can be subject to low tolerances. A distance which is as small as possible is preferred; this leads to an increased signal strength.

The invention also proposes an electromagnetic actuator device, in particular a camshaft adjustment device, having a housing and at least one armature unit drivable along the or parallel to the axial direction in response to an energization of a stationary, axially oriented coil unit and configured to interact with at least one slide and/or plunger unit extending in the axial direction, in particular a plunger unit causing a camshaft adjustment of a combustion engine. The actuator device comprises a detection device which is designed for the contactless magnetic and/or electrical interaction with a shift gate and which comprises at least one magnetic field and/or electric field detection means which is configured to create and/or detect a detection field actable directly on the shift gate. The actuator device is configured to interact with a detection field evaluation means which is configured to determine the position of the shift gate by means of the measured detection field, the magnetic field and/or electric field detection means being at least partially disposed outside the housing.

The electromagnetic actuator device according to the invention has substantially the advantages of the actuator arrangement, to which reference is hereby made.

It is conceivable that a longitudinal center axis passing through the at least one magnetic field and/or electric field detection means is preferably disposed at a distance from a plunger center plane in a direction parallel to a plunger longitudinal plane passing through the at least one plunger unit in the longitudinal direction, wherein the distance is preferably equivalent to half of the direct distance between two directly adjacent plunger units. This embodiment allows the clear detection of up to three shift positions using a single detection means, for example, in particular if two actuator units are disposed, wherein three actuator units are also conceivable. The most pronounced signal values can be assigned to respective positions of the plunger units by means of the distance mentioned above.

An embodiment can provide that the magnetic field detection means comprises a magnetic field sensor, in particular a Hall sensor, preferably a linear Hall sensor and/or a permanent magnet means. This leads to the advantages mentioned above.

In another preferred embodiment of the actuator device according to the invention, the actuator device comprises only one magnetic field and/or electric field detection means which is preferably configured to exclusively detect magnetic field lines which are oriented perpendicular to a sensitive surface. In each embodiment described above, the actuator arrangement can also comprise only a single magnetic field and/or electric field detection means. Since the invention allows a clear detection of up to three shift positions by means of only one detection means, there is no need for an additional detection means in such a design, as was previously known.

The invention also proposes the use of the electromagnetic actuator arrangement according to any one of claims 1 to 10 or of the electromagnetic actuator device according to any one of claims 11 to 14 in a combustion engine, a use in a vehicle combustion engine being preferred. The advantages according to the invention are particularly effective in such a use.

The use according to the invention has substantially the advantages of the actuator arrangement, to which reference is hereby made.

All combinations of at least two features disclosed in the description, the claims and/or the figures constitute part of the scope of the invention.

To avoid repetitions, disclosed features relating to the device are also seen as relating to the method and are thus also claimable therefor. In the same manner, disclosed features relating to the method are also seen as relating to the device and are thus also claimable therefor.

BRIEF DESCRIPTION OF THE DRAWINGS

Further advantages, features and details of the invention are apparent from the following description of exemplary embodiments and from the drawing.

In the drawing,

FIGS. 1a-1c: show schematic views of an actuator device according to the invention in three different engagement positions according to a first embodiment;

FIG. 2: shows a lateral view of the actuator device according to FIG. 1a;

FIG. 3: shows a perspective view of the actuator device according to FIG. 1a;

FIG. 4: shows a bottom view of the actuator device according to FIG. 1a;

FIG. 5: shows a diagram of a magnetic field measurement;

FIGS. 6a-6c: show schematic illustrations of the orientation of a magnetic field detection means in relation to the shift gate in three different engagement positions according to FIGS. 1a to 1c.

FIG. 7: shows a schematic view of an actuator device according to the invention according to a second embodiment;

FIG. 8: shows a bottom view of the actuator device according to FIG. 7; and

FIG. 9: shows a lateral view of the actuator device according to FIG. 7.

DETAILED DESCRIPTION

FIGS. 1a to 1c show identical elements in three different positions of a shift gate 12, wherein shift gate 12 is axially adjustable along an adjustment axis 30 in order to adjust a camshaft, for example. For the sake of clarity, not all figures of FIGS. 1a to 1c are provided with reference signs. However, with respect to the first embodiment, the same elements can be found in FIGS. 1a to 1c, 2, 3, 4 and 6a to 6c.

An actuator arrangement shown in FIGS. 1a to 6c comprises an electromagnetic actuator device 2 which is realized as a camshaft adjustment device. Actuator device 2 has a housing 4 within which two armature units (not shown) are drivable along the or parallel to the axial direction in response to an energization of two stationary, axially oriented coil units. Actuator device 2 thus comprises a plurality of electromagnetic actuator units which can be selectively controlled in order to independently apply an actuation force to a corresponding plurality of slides and/or plungers 8, 10 located axially parallel to one another. Each armature unit interacts with a plunger unit 6, 7 which extends in the axial direction and which is in particular realized as a plunger unit 6, 7 which causes a cam adjustment of a combustion engine. Plunger unit 6 comprises plunger 8 and plunger unit 7 comprises plunger 10. A separate armature unit is assigned to each of plungers 8, 10. Plungers 8 and 10 are disposed adjacent to one another in the axial adjustment direction of shift gate 12 and a plunger longitudinal plane 58 (shown in FIGS. 2 and 4) passes through plungers 8 and 10 in their longitudinal direction.

The actuator arrangement also comprises shift gate 12 which is disposed on a sliding cam 14. Shift gate 12 has three groove walls 16, 18 and 20, respective guide grooves 22 and 24 for plungers 8 and 10 thus being realized between adjacent groove walls 16 and 20 and between 20 and 18, respectively. Thus, three actuation positions (shown in FIGS. 1a to 1c) are realized. For the axial adjustment of shift gate 12, at least one of plungers 8 and 10 can engage into at least one corresponding guide groove 22, 24. At least one of groove walls 16, 18 and 20 interacts with the detection field and changes or deforms it depending on the axial position of shift gate 12. A transverse center plane 56 passes through shift gate 12 in such a manner that adjustment axis 30 axially passing through shift gate 12 also passes through transverse center plane 56 as a normal axis. Transverse center plane 56 intersects plunger longitudinal plane 58 at right angles. In the axial direction of shift gate 12, transverse center plane 56 is disposed in the geometric center. A mirror symmetry plane (which does not have a reference sign) of shift gate 12 coincides with transverse center plane 56.

Actuator device 2 has a detection device or a single shift gate position detection device which is designed for the contactless magnetic interaction with shift gate 12 and which comprises a magnetic field detection means which is realized as linear Hall sensor 26. The magnetic field detection means, i.e., Hall sensor 26, is used for the detection of a detection field acting directly on shift gate 12. The actuator arrangement comprises a permanent magnet (not shown) for creating the detection field which is located between Hall sensor 26 and shift gate 12. Additionally, the actuator arrangement can comprise a detection field evaluation means 32 which is configured to determine the position of shift gate 12 by means of the measured detection field. To transmit the measured magnetic field or the signal value from the magnetic field detection means to detection field evaluation means 32, a data line 36 is provided; data line 36 is shown as wired, but it can also be realized in a wireless manner and connects the one plug connection 50 to detection field evaluation means 32.

Furthermore, the actuator arrangement can comprise magnetic field shield means for shielding the detection field from the at least one magnetic field of the at least one coil unit of actuator arrangement 2.

Hall sensor 26 is at least partially disposed outside housing 4 in such a manner that it is disposed in the area between housing 4 and shift gate 12, as shown in particular in the lateral view in the direction of adjustment axis 30 in FIG. 2. The direct distance (A) between the sensitive surface of Hall sensor 26 and shift gate 12 is between 0 mm and 2.0 mm. At the same time, Hall sensor 26 is partially integrated into plastic housing 4 of actuator arrangement 2, housing 4 being produced according to an injection molding process. Hall sensor 26 is thus disposed adjacent to the outlet end of housing 4.

The embodiment of the invention shown in FIGS. 1a to 6c comprises a single Hall sensor 26 through which a longitudinal center axis 27 passes in its longitudinal direction and which is offset in the direction of adjustment axis 30 of shift gate 12 or of sliding cam 14 by an offset V1 with respect to a plunger center plane 52 midway between plungers 8 and 10. Hall sensor 26 has a sensitive surface 26a. Shown offset V1 does not correspond exactly to half of the direct distance between the two directly adjacent plunger units 6, 7, which is also shown in FIG. 5. As FIG. 4 shows, plunger center plane 52 intersects plunger longitudinal plane 58 at right angles. Moreover, Hall sensor 26 is offset in relation to plunger longitudinal plane 58 by an offset V2 in the direction of shift gate 12 or sliding cam 14 which is orthogonal to the direction of adjustment axis 30, as shown in FIGS. 2 and 4. FIG. 1b also shows that Hall sensor 26 is offset in relation to transverse center plane 56 by an offset V4 in the direction of adjustment axis 30 of shift gate 12 or of sliding cam 14, said arrangement applying to shown center position MS.

Each of FIGS. 1a to 1c also shows that longitudinal center axis 27 of Hall sensor 26 is disposed outside the mirror symmetry plane of shift gate 12 in each engagement position or shift position between at least one of plunger units 6, 7 and shift gate 12; here it should be noted that the mirror symmetry plane coincides with transverse center plane 56. The following applies: V1≠0 and V4≠0 (if applicable in any engagement position if mirror symmetry exists). If Hall sensor 26 was disposed directly centrally between plungers 8 and 10 or symmetrically in relation to shift gate 12 in the shown example, the position detection would be subject to high tolerances and would thus not be reliable, at least in center position MS according to FIG. 1b. The signal would possibly be unclear. In particular, FIGS. 1a to 1c also show that different shift gate geometries exist in each engagement position or shift position on either side of the electric field detection means in the direction of adjustment axis 30.

A shared plug connection 50 for actuator device 2 and/or the magnetic field detection means can be realizable integrally with housing 4.

The fundamental finding of the invention is that the detection field changes or is deformed when shift gate 12 is axially adjusted, that each axial position of shift gate 12 creates its own characteristic field and that each field change or deformation thus makes it possible to determine an axial position of shift gate 12 if the magnetic field detection means is disposed in a suitable manner.

FIG. 3 shows actuator arrangement 2 according to the first embodiment in isolation from a perspective bottom view. The figure shows recesses 60 which serve as fixation means and through each of which a screw can pass to fix actuator device 2 to a fixation partner.

FIG. 4 shows in particular offsets V1 and V2 and the location and orientation of planes 52 and 58 relative to one another. The figure also shows an offset V3 between longitudinal center axis 27 of Hall sensor 26 and a longitudinal axis of plunger 10. Offset V3 is zero in the event that offset V1 corresponds exactly to half of the direct distance between the two directly adjacent plunger units 6, 7. In other words, no offset V3 is provided if longitudinal center axis 27 and the longitudinal axis of plunger 10 are not offset to one another transverse to adjustment axis 30—otherwise, V3 is >0.

FIG. 5 shows a diagram of the change in the measured magnetic field or the flux density in Gauss [G] in relation to an axial adjustment of shift gate 12 along its adjustment axis 30 in millimeters [mm]. FIG. 5 shows a first tolerance situation (0.5 mm) of the sensitive surface of Hall sensor 26 in relation to shift gate 12 and a second tolerance situation (1.0 mm) of the sensitive surface of Hall sensor 26 in relation to shift gate 12, wherein the tolerance situation can also be referred to as sensor distance A. The figure shows that each axial position of shift gate 12 creates a clear characteristic change in the magnetic field and that an axial position of shift gate 12 is thus determinable.

Switching thresholds for the actuator arrangement can be stored in a memory 34 of evaluation means 32. Each switching threshold is defined via a duty cycle in percent and not directly via the flux density value. Thus, the signal of Hall sensor 26 is evaluated. The detected flux density value is output in a percentage duty cycle, i.e., in a PWM value. Duty cycle is understood as an expression of the percentage of the maximum power with which a pulse width modulation (PWM) drives a load. A duty cycle and therefore a shift position can thus be assigned to each flux density value or flux density value range.

To illustrate this, the left position of shift gate 12 in relation to actuator device 2 is illustrated in FIG. 5 by a dash-dotted line, said actuating position corresponding to FIGS. 1a and 6a. In the position of shift gate 12 shown in FIGS. 1a and 6a, plunger 10 can engage into guide groove 22. Plunger 8 is located outside an engagement option into shift gate 12. From the perspective of FIGS. 1a and 6a, sensor 26 is located between groove walls 16 and 20.

Furthermore, a center position MS, which corresponds to the axial position of shift gate 12 shown in FIGS. 1b and 6b, is illustrated in FIG. 5 by a dashed line. As shown in FIGS. 1b and 6b, plunger 8 can engage into guide groove 22 and plunger 10 can engage into guide groove 24 in this position. From the perspective of FIGS. 1b and 6b, sensor 26 is located between groove walls 18 and 20.

Moreover, a right position, which corresponds to the axial position of shift gate 12 shown in FIGS. 1c and 6c, is illustrated in FIG. 5 by a dash-dotted-line. In this position, plunger 8 can engage into guide groove 24, plunger 10 being located outside an engagement option into shift gate 12, as shown in FIGS. 1c and 6c. From the perspective of FIGS. 1c and 6c, sensor 26 is located to the right of groove wall 18.

It is conceivable that evaluation means 32 is also configured to determine each axial position of shift gate 12.

Shift gate 12 can be displaced between the left and the right position by approximately 10.5 mm, wherein said dimension is merely exemplary and different magnetic field courses result depending on the distance of adjacent plunger units and shift gate geometries. Center position MS is approximately 5.25 mm away from each of the two outer positions. In center position MS, Hall sensor 26 is displaced to the right by approximately 2.8 mm in relation to the illustrated ordinate axis. This displacement corresponds to measure V4.

Looking at FIG. 5, it can be seen that, when shift gate 12 is displaced from the left position into center position MS, the flux density first reaches a global maximum at approximately −2 mm and then decreases to the value zero on the ordinate axis—this applies to both tolerance situations. In the zero point, longitudinal center axis 27 of the one Hall sensor 26 is within the mirror symmetry plane of shift gate 12. At this point, the measurement does therefore not allow any clear conclusion on the axial position of the shift gate. In the zero point, however, there is no engagement position, which means that shift gate 12 merely passes through said zero point. When shift gate 12 is further displaced, the flux density decreases and reaches a global minimum at approximately 2 mm, which is followed by center position MS at approximately 2.8 mm. When shift gate 12 is further displaced to the right, the right position is reached at approximately 7.8 mm. If offset V1 corresponded exactly to half of the direct distance between the two directly adjacent plunger units 6, 7, the left position (FIG. 6a) and the right position (FIG. 6c) would be exactly in the corresponding global minimum and maximum, respectively.

In the following, only the essential differences of FIGS. 7 to 9 compared to the first embodiment (shown in FIGS. 1 to 6c) are to be described.

Actuator device 2 comprises a single electromagnetic actuator unit which can be selectively controlled in order to apply an actuation force to a slide and/or a plunger 8. Actuator device 2 has a detection device or a single shift gate position detection device which is designed for the contactless magnetic interaction with a shift gate 12 (not shown) and which comprises a magnetic field detection means which is realized as linear Hall sensor 26. The magnetic field detection means, i.e., Hall sensor 26, is used for the detection of a detection field acting directly on shift gate 12. Hall sensor 26 is partially integrated into housing 4. The actuator arrangement comprises a permanent magnet (not shown) for creating the detection field which is located between Hall sensor 26 and shift gate 12.

To illustrate the arrangement of shift gate 12, adjustment axis 30 is drawn in to represent shift gate 12 and sliding cam 14.

Longitudinal center axis 27 and the longitudinal axis of plunger 8 are offset to one another transverse to adjustment axis 30, offset V3 thus not being equal to zero.

The invention claimed is:

1. An electromagnetic actuator arrangement comprising an electromagnetic actuator device (2), having a housing (4) and at least one armature unit drivable along the or parallel to the axial direction in response to an energization of a stationary, axially oriented coil unit and configured to interact with at least one slide and/or plunger unit (6, 7) extending in the axial direction, and
at least one shift gate (12) which can be disposed on a sliding cam (14) and through which a transverse center plane (56) passes,
wherein
the actuator device (2) comprises a detection device which is designed for the contactless magnetic and/or electrical interaction with the shift gate (12) and which comprises at least one magnetic field and/or electric field detection means which is configured to create and/or detect a detection field acting directly on the shift gate (12), and which comprises a detection field evaluation means (32) which is configured to determine the position of the shift gate (12) by means of the measured detection field,
the magnetic field and/or electric field detection means being at least partially disposed outside the housing (4).

2. The electromagnetic actuator arrangement according to claim 1, wherein the magnetic field detection means comprises a magnetic field sensor, and/or a permanent magnet means.

3. The electromagnetic actuator arrangement according to claim 1, wherein, at least in a center position (MS) of the plunger unit (6) or of the plunger units (6, 7) in relation to the shift gate (12), a longitudinal center axis (27) passing through the at least one magnetic field and/or electric field detection means is disposed at a distance (V4) from the transverse center plane (56) of the shift gate (12) in the longitudinal direction of an adjustment axis (30) of the sliding cam (14).

4. The electromagnetic actuator arrangement according to claim 1, wherein, in at least one, engagement position between the at least one plunger unit (6, 7) and the shift gate (12), a longitudinal center axis (27) of the at least one magnetic field and/or electric field detection means passing through the at least one magnetic field and/or electric field detection means is disposed outside a mirror symmetry plane of the shift gate (12).

5. The electromagnetic actuator arrangement according to claim 1, wherein, in at least one, engagement position between the at least one plunger unit (6, 7) and the shift gate (12), a longitudinal center axis (27) of the at least one magnetic field and/or electric field detection means passing through the at least one magnetic field and/or electric field detection means is disposed and/or can be disposed in such a manner that the shift gate (12) has different outer geometry shapes, on either side of the electric field detection means in the longitudinal direction of an adjustment axis (30) of the sliding cam (14).

6. The electromagnetic actuator arrangement according to claim 1, wherein the magnetic field and/or electric field detection means is at least partially disposed in the area between the housing (4) and the shift gate (12).

7. The electromagnetic actuator arrangement according to claim 1, wherein the magnetic field and/or electric field detection means is at least partially integrated into the housing (4) of the electromagnetic actuator device (2).

8. The electromagnetic actuator arrangement according to claim 1, further comprising a magnetic field shield means for shielding the detection field from the magnetic field of the coil unit.

9. The electromagnetic actuator arrangement according to claim 1, wherein the electromagnetic actuator device (2) has a plurality of electromagnetic actuator units which can be selectively controlled in order to independently apply an actuation force to a corresponding plurality of plunger units (6, 7) which are mounted axially parallel to one another, or wherein the electromagnetic actuator device (2) has a single actuator unit which can be selectively controlled in order to apply an actuation force to a plunger unit (6).

10. The electromagnetic actuator arrangement according to claim 1, wherein
the direct distance (A) between the sensitive surface of the at least one magnetic field and/or electric field detection means and the shift gate (12) is between 0 mm and 2 mm.

11. An electromagnetic actuator device (2), having a housing (4) and at least one armature unit drivable along the or parallel to the axial direction in response to an energization of a stationary, axially oriented coil unit and configured to interact with at least one slide and/or plunger unit (6, 7) extending in the axial direction, wherein the actuator device (2) comprises a detection device which is designed for the contactless magnetic and/or electrical interaction with a shift gate (12) and which comprises at least one magnetic field and/or electric field detection means which is configured to create and/or detect a detection field actable directly on the shift gate (12) and which is configured to interact with a detection field evaluation means (32) which is configured to determine the position of the shift gate (12) by means of the measured detection field, the magnetic field and/or electric field detection means being at least partially disposed outside the housing (4).

12. The electromagnetic actuator device (2) according to claim 11, wherein a longitudinal center axis (27) passing through the at least one magnetic field and/or electric field detection means is disposed at a distance (V1) from a plunger center plane (52) in a direction parallel to a plunger longitudinal plane (58) passing through the at least one plunger unit (6, 7) in the longitudinal direction.

13. The electromagnetic actuator device (2) according to claim 11, wherein the magnetic field detection means comprises a magnetic field sensor, and/or a permanent magnet means.

14. The electromagnetic actuator device (2) according to claim 11, further comprising a single magnetic field and/or electric field detection means which is configured to exclusively detect magnetic field lines which are oriented perpendicular to a sensitive surface.

15. A vehicle combustion engine comprising the electromagnetic actuator arrangement according to claim 1.

16. The electromagnetic actuator arrangement according to claim 1, wherein the electromagnetic actuator device (2) is a camshaft adjustment device configured to interact with the plunger unit (6, 7) causing a camshaft adjustment of a combustion engine.

17. The electromagnetic actuator arrangement according to claim 2, wherein the magnetic field sensor comprises a linear hall sensor.

18. The electromagnetic actuator arrangement according to claim 10, wherein the direct distance (A) is between 0.5 mm and 1.0 mm.

19. The electromagnetic actuator arrangement according to claim 12, wherein the distance (V1) is equivalent to half of the direct distance between two directly adjacent plunger units (6, 7).

* * * * *